E. P. CAMPBELL.
ANNULAR BEARING PULLER.
APPLICATION FILED FEB. 7, 1921.

1,425,836.

Patented Aug. 15, 1922.

INVENTOR.
Ernest P. Campbell
BY
ATTORNEY

UNITED STATES PATENT OFFICE.

ERNEST P. CAMPBELL, OF STOCKTON, CALIFORNIA.

ANNULAR-BEARING PULLER.

1,425,836.  Specification of Letters Patent.  Patented Aug. 15, 1922.

Application filed February 7, 1921. Serial No. 442,919.

*To all whom it may concern:*

Be it known that I, ERNEST P. CAMPBELL, a citizen of the United States, residing at Stockton, county of San Joaquin, State of California, have invented certain new and useful Improvements in Annular-Bearing Pullers; and I do declare the following to be a full, clear, and exact description of the same, reference being had to the accompanying drawings, and to the characters of reference marked thereon, which form a part of this application.

This invention relates to improvements in devices for pulling or removing annular bearings from their shafts, and is particularly adapted and intended to remove the bearings from the armature shafts of automobile generators when it is necessary to do so for any reason.

In this type of mechanism, the bearings are driven on the shaft, and when the latter with its windings which form the armature and which are permanently mounted thereon is removed from its frame or housing, these bearings are removed therewith, and are usually so close to the windings that they cannot readily be driven off by ordinary means without danger of seriously damaging the armature, besides the bearing itself.

The principal object of my invention is to provide a device by means of which the bearing may easily and quickly be removed from the shaft, without the possibility of damage to the shaft, armature or bearing.

A second object is to so construct the puller that a single size thereof serves for bearings of various diameters within reasonable limits, and may be utilized irrespective of the distance of the bearing from the adjacent end of the shaft.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
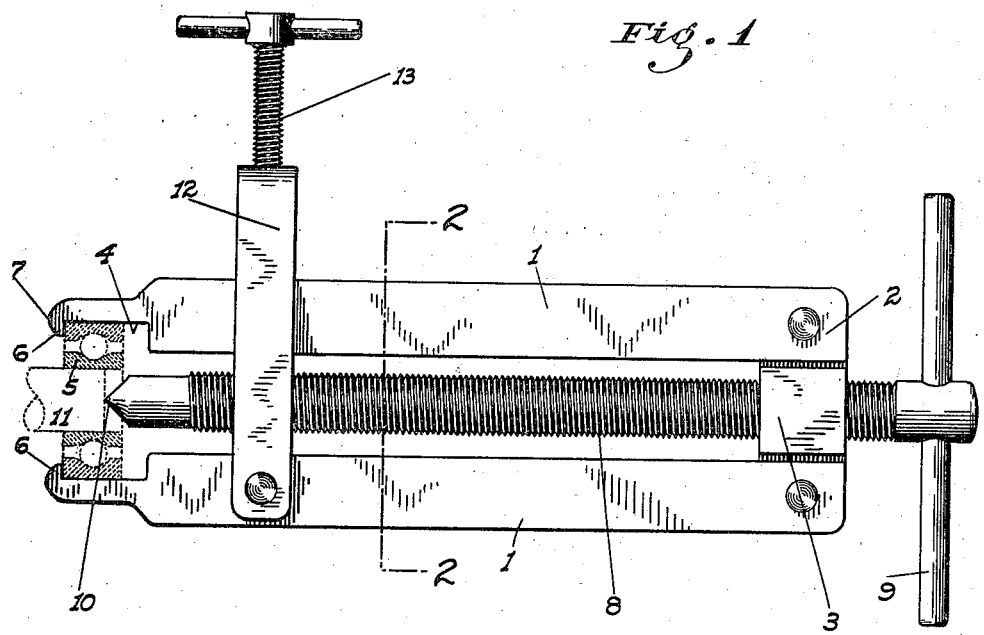
Fig. 1 is a side elevation of the device, showing the same in operation.
Figure 2:
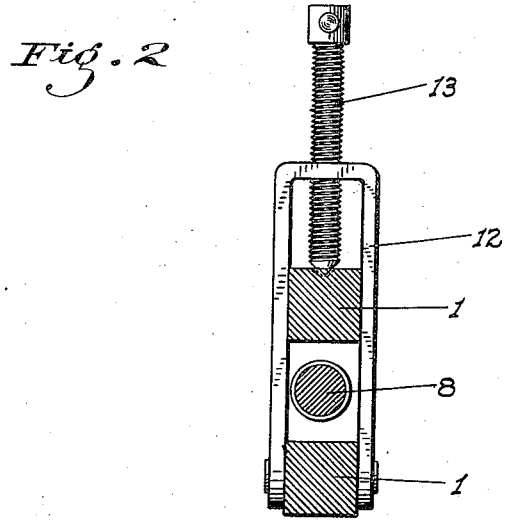
Fig. 2 is a cross section taken on a line 2—2 of Fig. 1.

Referring now more particularly to the characters of reference on the drawings, the numeral 1 denotes a pair of inflexible arms suitably spaced apart and pivoted at one end as at 2 to opposite sides of a block 3. The other ends of said arms are recessed transversely on the inner or adjacent faces for a certain distance as shown at 4, these portions being of sufficient length to receive the width of an annular bearing 5 therein, the outer periphery of said bearing being engaged by the faces of said recessed portion when the device is in operation. The ends of the arms beyond the recesses form lugs 6 projecting inwardly beyond the recess-faces and at right angles thereto, so as to engage the inner face of the bearing.

The outer surface of the lugs are rounded off or edged as at 7, and the adjacent portion of the arms themselves, are made as thin as compatible with strength, so that they may be inserted to grasp bearings having but little free space therearound, as sometimes occurs with armatures in which the windings overhang the bearings to a certain extent.

It may here be noted that the recesses in the arms are mainly to decrease the amount to which the arms must be spread to engage a bearing, while maintaining the pivotal connections of the arms fairly close together so that said arms extend substantially parallel.

Threaded into the block 3 is a screw 8 on the outer end of which is a turning handle 9, while the inner end terminates in a point 10 adapted to seat in the usual axial lathe-spindle hole provided in the shaft 11 from which the bearing is to be removed. The screw is arranged to be turned to move it lengthwise of the arms in either direction, and is allowed sufficient possibility of movement in the direction of the lugs, so that the point will at least extend to the plane of a line drawn between the lugs, so that the bearing may be entirely freed from the shaft.

Pivoted to one of the arms 1 is a U shaped yoke 12, straddling both arms and projecting beyond the one from which it is free, the latter arm being slidable in the yoke. Turnable in the cross-bar of said yoke is a screw 13, bearing on the outer face of the free arm, so as to allow said arms to be drawn together to tightly engage and clamp about the bearing 5.

In operation, the arms are spread sufficiently to pass over the bearing.

The screw 8 having been first retracted sufficiently to remove it beyond the adjacent end of the shaft, it is then turned to engage the same. The block 3 having flexibility of movement in one direction relative to the arms, the point of said screw is readily positioned centrally of the shaft, and the screw 13 then turned to clamp the arms over the bearing. By then turning the screw 8, the bearing and shaft are gradually forced in opposite directions so as to bring the bearing over the end of the shaft. Once removed from the shaft, the bearing is withdrawn from the puller by retracting the screw 13 to free the arms.

From the foregoing description it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claim.

Having thus described my invention, what I claim as new and useful and desire to secure by Letters Patent is:

An annular bearing puller comprising a pair of arms extending in the same direction in a common plane, being flexibly connected together at one end, the other end of said arms being formed to engage the outer surface of a bearing, a yoke connected to one arm and through which the other arm extends with freedom of movement, and a turnable screw mounted in the yoke and adapted to engage the free arm to limit the spacing between said arms at the bearing engaging end thereof.

In testimony whereof I affix my signature.

ERNEST P. CAMPBELL.